Figure 1:
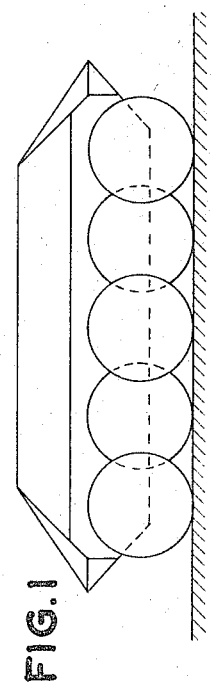

May 2, 1967 K. SCHINDLER 3,316,992
STEERING MECHANISM FOR VEHICLES WITH NON-DIRIGIBLE WHEELS
Filed Aug. 25, 1964 2 Sheets-Sheet 1

INVENTOR.
Karl Schindler
BY
James E. Bryan
ATTORNEY

INVENTOR.
Karl Schindler

United States Patent Office 3,316,992
Patented May 2, 1967

3,316,992
STEERING MECHANISM FOR VEHICLES WITH NON-DIRIGIBLE WHEELS
Karl Schindler, Frankfurt am Main, Germany, assignor to Henschel-Werke A.G., Kassel, Germany, a corporation of Germany
Filed Aug. 25, 1964, Ser. No. 391,862
4 Claims. (Cl. 180—6.2)

This invention relates to a guiding or steering system for vehicles having non-dirigible wheels which may also be enclosed by tracks and are movably mounted with respect to the vehicle body only in the vertical direction.

It has already been attempted to produce steering effects on groups of wheels, particularly wheel groups enclosed by tracks, by imparting different speeds to the individual wheels or axles or by simply braking the driving wheels on one side of the vehicle. This method, however, fails to take into account the fact that when steering tracked vehicles or vehicles having non-dirigible wheels only one component of the superimposed steering speed or steering rate of revolutions become effective and this depends upon the geometrical position of the wheels with respect to the center of rotation of the vehicle. The result is that very high power losses are sustained during steering which can become so great that an orderly steering operation is not assured and, also, the wear and tear on the wheels assumes proportions which practically annuls the advantages of wheeled vehicles as compared to tracked vehicles.

This is the reason why wheeled vehicles having more than two axles, which distinguish over tracked vehicles by a considerably greater durability and longer service life in the traveling elements thereof, do not steer nearly satisfactorily enough so that such vehicles, which are of particular interest for military purposes, have not been built in large numbers heretofore. Such multi-wheel vehicles have a low individual wheel loading and can attain higher speeds than can tracked vehicles and the like.

The present invention makes possible the steering of vehicles having non-dirigible wheels and also multi-wheel vehicles having more than two axles in a manner such as to practically eliminate the disadvantages heretofore present in the steering of such vehicles. In the present invention, wheel drives are provided such that rates of revolutions for individual wheel pairs are superimposed on the drive shaft according to the following equation:

$$n_{L0}:n_{L1}:n_{L2}:n_{Lx} = B_0 : \frac{B_1{}^2 + l_1{}^2}{B_1} : \frac{B_2{}^2 + l_2{}^2}{B_2} : \frac{B_x{}^2 + l_x{}^2}{B_x}$$

in which $n_{L0}$, $n_{L1}$, $n_{L2}$, and $n_{Lx}$ represent in each case the respective steering rate of revolutions being superimposed to the wheel pairs O, 1, 2, and $x$; $B_0$, $B_1$, $B_2$, and $B_x$ are the wheel treads and $l_1$, $l_2$, and $l_x$ are the wheel bases of the wheel pairs, whereby pairs of wheels positioned at the same distance from an axle extending transversely through the rotational steering center "A" of the vehicle body represent in each case one wheel group with the same index O, 1, 2, to "$x$."

The ratio of the steering rate of revolutions derived hereinabove is valid for a vehicle with a symmetrical arrangement of the axles in the longitudinal direction with respect to the steering center "A" (vertical axis through the center of gravity) of the vehicle. Accordingly, this theory also is valid for an asymmetrical arrangement of the axles with respect to the steering center "A."

The construction of the steering drive may be accomplished using known mechanical gears or by means of known hydraulic components. Electrical means such as gear motors may also be employed and in any of these arrangements, the steering of the driving elements may be effected electronically.

The invention will be further illustrated by reference to the accompany drawings in which one embodiment of the present invention is schematically illustrated.

Figure 2:
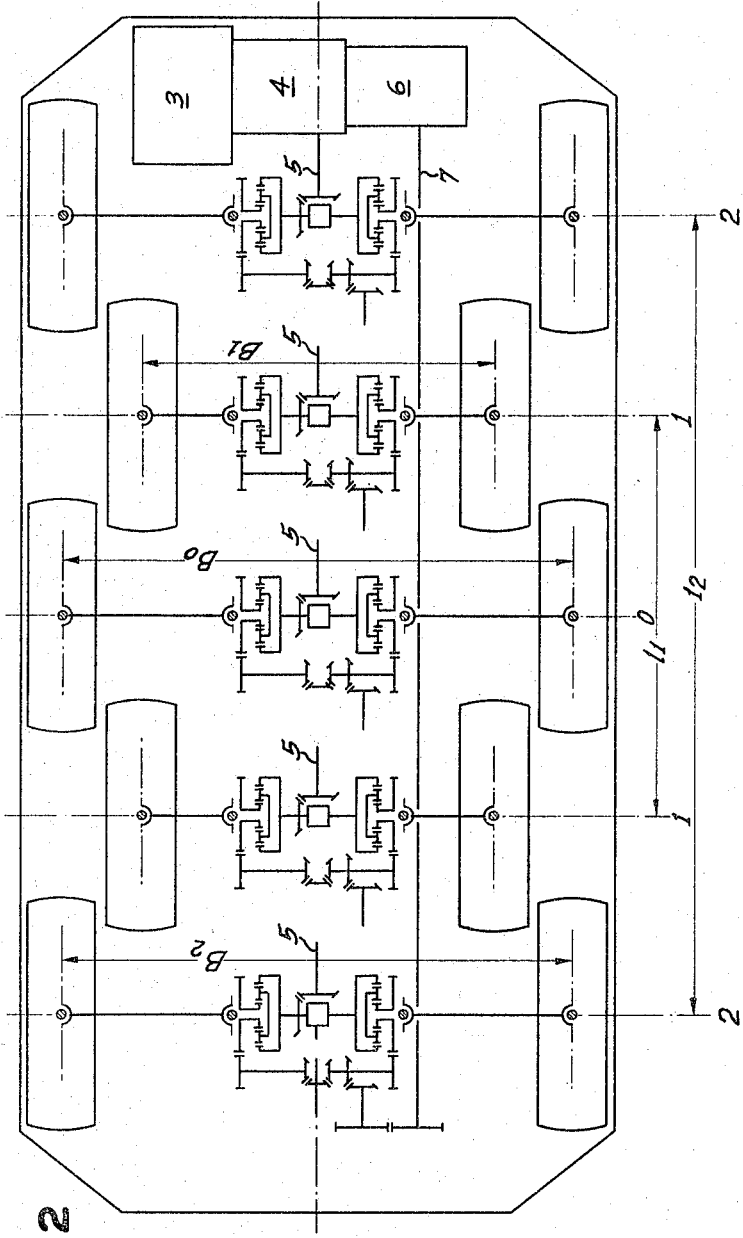
Figure 3:
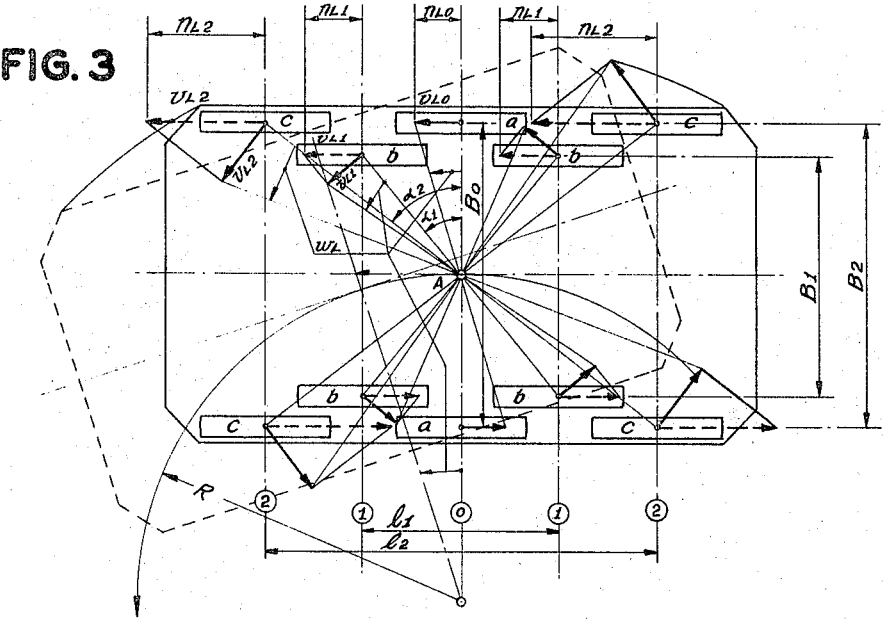
Figure 4:
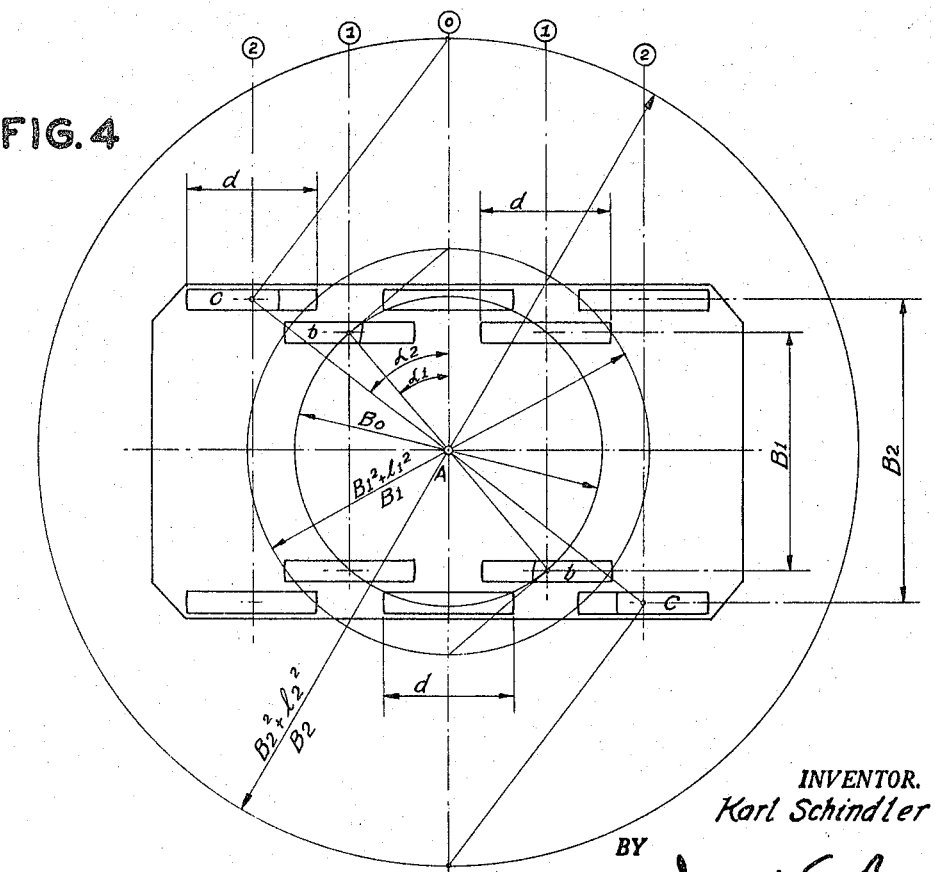

FIGURE 1 is a view in elevation of a wheeled vehicle having five axles and five pairs of wheels, respectively, certain of which are mounted with different wheel treads, FIGURE 2 is a bottom view of the vehicle of FIGURE 1, and FIGURES 3 and 4 show the theoretical interrelation and mechanism of the operations during steering and turning of the vehicle.

In order to render the entire driving force of each of the vehicle wheels operative or effective for steering, each wheel, or group of wheels, must have that steering rate of revolutions whose tangential component imparts a uniform steering speed to the vehicle $\omega_L[1/\text{sec.}]$.

In the drawing, O identifies an axle extending through the rotational steering center of the vehicle. This axle and the pair of wheels mounted thereon, respectively, need not necessarily be disposed in the center of the vehicle, as shown in the embodiment of the drawing but, in most instances, it is positioned in such a manner that it coincides with the transverse axis extending through the center of gravity of the vehicle. Reference numeral 1 designates pairs of wheels mounted at the same distance from the aforementioned O axle toward both ends of the vehicle, while reference numeral 2 similarly designates successive pairs of wheels. Reference numeral 3 designates the driving engine, which may be of any suitable type such as a diesel engine or gasoline burning internal combustion engine, numeral 4 designates the gear shift mechanism, numeral 5 designates the traveling gear or drive shaft having he same gear ratio for all the wheels, 6 is the steering gear, and 7 is the superimposed steering drive to provide the rate of revolutions indicated by the equation above.

Also plotted are the treads $B_0$, $B_1$ and $B_2$ of the respective wheel pairs and the wheel bases $l_1$ and $l_2$ of the respective wheel groups having the same index. The drawings illustrate a steering drive mechanically superimposed on the drive shaft by means of summation planetary gears which are positioned in the gear hubs of the wheels, although this steering drive may be effected in a number of other ways as indicated above.

The ratio of the superimposed rates of revolution is independent of the length of the respective steering radius. The rates of revolution $n_{L0}$ to be superimposed on the pair of wheels on axle O is calculated in a conventional manner on the basis of the required turning speed $$\omega_L = \frac{2\pi}{t} \text{ (1/sec.)}$$

the wheel tread $B_0$ and the diameter of the driving wheel "$d$." Starting with this rate of revolutions $n_{L0}$ used as a basis, the rates of revolutions to be superimposed on the other pairs of wheels $n_{L1}$, $n_{L2}$–$n_{Lx}$ then may be easily determined according to the equation on which the system of the driving arrangement of the present invention is based.

In FIGURES 3 and 4, the following identifications and definitions have been employed:

$a$—for the points of tangency of the wheels on the ground (wheels on the center axle O)
$b$—for the points of tangency of the wheels on the ground (wheels on the axles 1)
$c$—for the points of tangency of the wheels on the ground (wheels on the axles 2)
$l_1$ [m] wheelbase of axles 1, 1
$l_2$ [m] wheelbase of axles 2, 2

$B_0$ [m] wheel tread of wheels $a$, $a$ on the center axle O
$B_1$ [m] wheel tread of wheels $b$, $b$ on the axles 1, 1
$B_2$ [m] wheel tread of wheels $c$, $c$ on the axles 2, 2
$d$—diameter of traveling wheel [m] (all wheels)
O, 1, 2, designation of the axles with respect to the vehicle steering center A
A—steering center, vertical axis through center of the vehicle (center of gravity)
$\alpha_1$ (degree) angle of inclination of the connecting line of the center of tire impact of the wheels $b$-A-$b$ to the center axle $a$-A-$a$
$\alpha_2$ (degree) angle of inclination of the connecting line of the center of tire impact of the wheels $c$-A-$c$
$\omega_L$ [1/s] steering speed of the entire vehicle
$\nu_{L0}$ [m/s] steering speed—rolling-off speed of the wheels $a$, $a$ of the axle center during turning of the vehicle from a standstill about the center A
$\nu_{L1}$ [m/s] steering speed (effective) of wheels $b$, $b$
$\nu_{L2}$ [m/s] steering speed (effective) of wheels $c$, $c$
$\nu_{L1}$ [m/s] rolling-off speed of wheels $b$, $b$ during steering and turning about the steering center A
$\nu_{L2}$ [m/s] rolling-off speed of wheels $c$, $c$ during steering and turning about the steering center A
$n_{L0}$ rate of revolution of the wheels $a$, $b$, $c$
$n_{L1}$ [r.p.m.] during steering action which correspond to
$n_{L2}$ the steering rolling-off speeds
$n_{Lx}$
V—[m/s] and, respectively, km./hr.; traveling speed of the vehicle
R—[m] steering radius, referred to the tread center
$t$—[sec.] time for turning about 360°.

It will be seen from FIGURES 3 and 4 that only in the case of the wheels on the axle O, which extends through the steering center or center of gravity of the vehicle, will the full steering speed or the steering rate of revolutions be used for steering or turning of the vehicle. The rolling-off direction of the wheels on the central axle O is tangent to the steering circle $B_0$ about the steering center A. The tangent lines extending through the centers of the tire impact of the wheels on axles 1, 2, and $x$, respectively, at the steering circles enclose, with the rolling-off directions of the respective wheels, the angles $\alpha_1$, $\alpha_2$, and $\alpha_x$, respectively.

Accordingly, the wheels on the axles 1, 2, and $x$, respectively, must be driven at correspondingly higher steering rates of revolutions than the wheels on the axle O. The differently larger steering rates of revolutions required are determined by the geometrical position of the individual wheels to the steering center A, and they act with respect to each other in accordance with the equation given above.

Starting with a turning speed chosen at random, when turning from a standstill through an angle of 360° in a time of $t$ seconds, a maximum angular steering velocity of $$\omega_L = \frac{t}{2\pi} [1/s]$$

results. This also results in a steering rate of revolutions of the traveling wheels having the diameter $d$, on the center axle with:

$$n_{L0} = \frac{60 \cdot \omega_L \cdot \frac{B_0}{2}}{d \cdot \pi} [r.p.m.] = \frac{60 \omega_L}{2d\pi} \cdot B_0 = k \cdot B_0$$

whereby $$k = \frac{60 \omega_L}{2d \cdot \pi}$$

$$n_{L1} = n_{L0} \cdot \frac{\frac{B_1}{2 \cos \alpha_1}}{\frac{B_0}{2}} = n_{L0} \cdot \frac{B_1}{B_0 \cdot \cos \alpha_1}$$

$$n_{L1} = \frac{n_{L1}}{\cos \alpha_1} = n_{L0} \frac{B_1}{B_0 \cdot \cos^2 \alpha_1} [r.p.m.]$$

$$\cos \alpha_1 = \frac{1}{\sqrt{l + \left(\frac{l_1}{B_1}\right)^2}}$$

$$\cos^2 \alpha_1 = \frac{l}{l + \frac{l_1^2}{B_1^2}}$$

$$n_{L1} = n_{L0} \cdot \frac{B_1}{B_0} \cdot \frac{l}{\cos^2 \alpha_1} = n_{L0} \cdot \frac{B_1}{B_0} \cdot \left(l + \frac{l_1^2}{B_1^2}\right)$$

$$n_{L1} = n_{L0} \cdot \frac{B_1}{B_0} \cdot \frac{B_1^2 + l_1^2}{B_1^2} = \frac{n_{L0}}{B_0} \cdot \frac{B_1^2 + l_1^2}{B_1}$$

$$n_{L2} = \frac{n_{L0}}{B_0} \cdot \frac{B_2^2 + l_2^2}{B_2}$$

$$n_{Lx} = \frac{n_{L0}}{B_0} \cdot \frac{B_x^2 + l_x^2}{B_x}$$

$$n_{L0} : n_{L1} : n_{L2} : n_{Lx} \cdots = B_0 : \frac{B_1^2 + l_1^2}{B_1} : \frac{B_2^2 + l_2^2}{B_2} : \frac{B_x^2 + l_x^2}{B_x}$$

In FIGURE 4, the steering rates of revolutions of the individual wheels have been illustrated graphically. The circumferences of the circles with the diameters $$B_0, \frac{B_1^2 + l_1^2}{B_1} \text{ and } \frac{B_2^2 + l_2^2}{B_2}$$

represent the length of the rolling curves, or paths of rolling, on which the traveling wheels roll off in a turn of about 360°. It is, accordingly, immaterial whether the vehicle is turned from a standstill or whether turning is effected from any desired curved sector or track of a large or small radius. In this manner, the regulation of the steering drive according to the present invention makes it possible to drive the non-dirigible wheels of a multi-wheel vehicle.

(a) when driving straight ahead at a uniform speed and
(b) when driving through curves with a steering radius of $R=0$ or turning from a standstill up to $R=\infty$, or driving straight on always with the respectively varying steering rates of revolutions in a manner such that each individual wheel imparts to the vehicle the respectively required identical angular steering velocity of $\omega_L$.

It will be obvious to those skilled in the art that many modifications may be made within the scope of the present invention without departing from the spirit thereof, and the invention includes all such modifications.

What is claimed is:

1. A method of steering a vehicle having a drive shaft and non-dirigible wheels which comprises superimposing rates of revolution for individual pairs of opposed wheels, each pair being mounted on a common axis, on that rate provided by the drive shaft, according to the equation:

$$n_{L0} : n_{L1} : n_{L2} : n_{Lx} = B_0 : \frac{B_1^2 + l_1^2}{B_1} : \frac{B_2^2 + l_2^2}{B_2} : \frac{B_x^2 + l_x^2}{B_x}$$

in which $n_{L0}$ is the rate of revolutions to be superimposed on wheels mounted on a first axis passing through the rotational steering center of the vehicle and having a tread $B_0$; $n_{L1}$, $n_{L2}$ and $n_{Lx}$ are rates of revolutions to be superimposed on wheel pairs mounted at different distances from the first axis and having treads $B_1$, $B_2$ and $B_x$ and wheelbases $l_1$, $l_2$ and $l_x$, respectively, wherein said superimposed rates of revolution are in opposite directions for each wheel of a pair.

2. A method according to claim 1 in which the rates of revolution are superimposed mechanically.

3. A method according to claim 1 in which the rates of revolution are superimposed hydraulically.

4. A method according to claim 1 in which the rates of revolution are superimposed electrically.

References Cited by the Examiner
UNITED STATES PATENTS 2,027,218 1/1936 Armington _____ 180—6.44 X
2,336,912 12/1943 Zimmerman _____ 180—6.44 X
3,052,311 9/1962 Leedom _____ 180—6.66

MILTON BUCHLER, *Primary Examiner.*

BENJAMIN HERSH, *Examiner.*

J. A. PEKAR, *Assistant Examiner.*